United States Patent [19]

Altine

[11] Patent Number: 5,274,802
[45] Date of Patent: Dec. 28, 1993

[54] METHOD FOR RESTORING LOST DATABASES BY COMPARING EXISTING DATABASE AND GENERIC DATABASE, AND GENERATING CELLULAR SWITCH COMMANDS TO UPDATE THE GENERIC DATABASE

[75] Inventor: Phillip Altine, Spring, Tex.

[73] Assignee: GTE Mobilnet Incorporated, Atlanta, Ga.

[21] Appl. No.: 659,192

[22] Filed: Feb. 22, 1991

[51] Int. Cl.⁵ ............................................. G06F 15/40
[52] U.S. Cl. ..................................... 395/600; 379/59;
379/60; 364/222.3; 364/283.4; 364/974.4;
364/919.4; 364/DIG. 1; 364/DIG. 2; 455/33.1;
455/33.2; 371/8.1; 395/575
[58] Field of Search ................... 364/DIG. 1, DIG 2;
395/600, 575; 379/59, 60; 371/7, 8.1; 455/33.1,
33.2

[56] References Cited

U.S. PATENT DOCUMENTS

| | | | |
|---|---|---|---|
| 4,153,931 | 5/1979 | Green et al. | 395/600 |
| 4,479,196 | 10/1984 | Ferrar et al. | 395/600 |
| 4,646,229 | 2/1987 | Boyle | 395/600 |
| 4,887,265 | 12/1989 | Felix | 370/94.1 |
| 4,916,691 | 4/1990 | Goodman | 370/60 |
| 4,958,368 | 9/1990 | Parker | 379/91 |

OTHER PUBLICATIONS

"EMX Operator's Input Message Manual System Recent Change Commands", EMX vol. 3, Book 2, pp. 5-205, 5-207 i-74, Motorola Inc, 1987.

Primary Examiner—Thomas C. Lee
Assistant Examiner—Paul Lintz

[57] ABSTRACT

An improved method is disclosed for automatically updating databases contained in the random access memory and tape storage of a cellular switch. First, instructions are issued to a cellular switch, causing the switch to provide a first output of one or more operative databases contained in the random access memory of the switch. Then, one or more backup databases are loaded into the random access memory of the switch, and instructions are issued to the switch causing the switch to provide a second output of the backup databases. The first and second outputs are then analyzed by a computer program, and in response to the analysis the program automatically assembles a number of cellular switch compatible software commands into a text file. Finally the text file is transmitted to the switch, thereby updating databases contained in the random access memory and the tape storage of the switch.

3 Claims, 7 Drawing Sheets

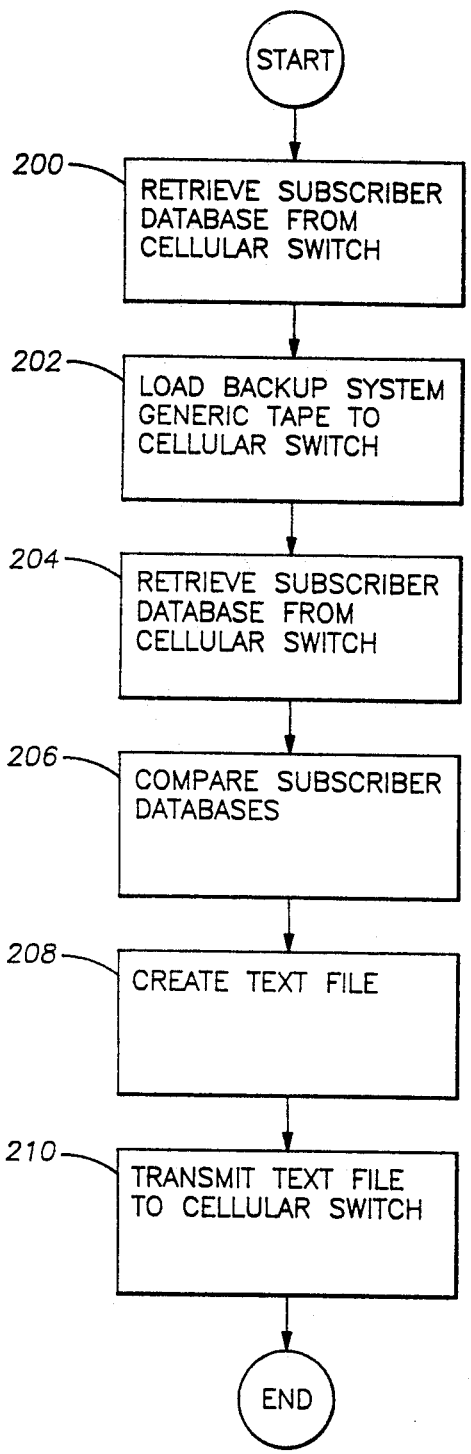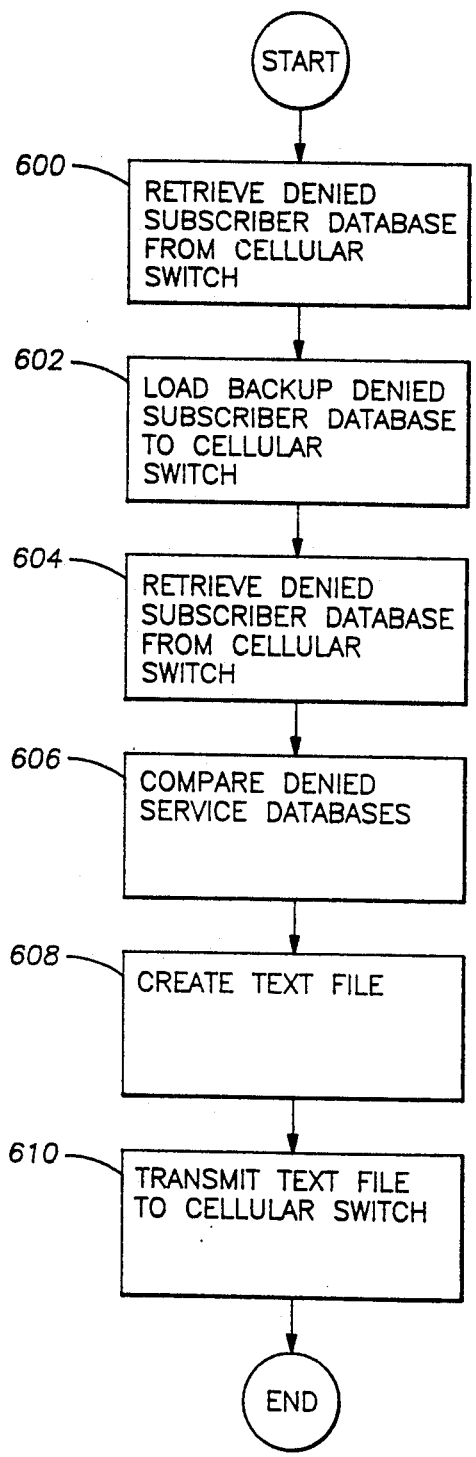
FIG. 2
FIG. 6

METHOD FOR RESTORING LOST DATABASES BY COMPARING EXISTING DATABASE AND GENERIC DATABASE, AND GENERATING CELLULAR SWITCH COMMANDS TO UPDATE THE GENERIC DATABASE

BACKGROUND OF THE INVENTION

1. Field of Invention

The present invention relates generally to the storage of data in a cellular switch, and more particularly to a software utility program and method for creating a new operative system generic tape by modifying a damaged system generic tape or updating a previously created backup system generic tape.

2. Description of Prior Arrangements

One of the principal components of a cellular telephone system is a cellular switch. A cellular switch that is associated with a cellular system contains a considerable amount of data which is used in the operation of the system. This data typically includes lists of cellular subscribers associated with the switch, mobile telephone numbers, electronic security numbers, cellular subscriber locations, and cellular subscriber service options. If the integrity of the data stored in a cellular switch is not adequately maintained, the cellular subscribers associated with the switch can experience a number of problems. For example, the subscribers might experience restrictive changes in their cellular service, or total interruption of service. In addition, loss of data from a cellular switch could affect the cellular service provider by permitting the switch to provide service to unauthorized cellular telephones. Consequently, proper maintenance and storage of the data of a cellular switch is integral to the efficient, uninterrupted operation of the cellular system.

One means that is used to store data in a cellular switch involves semiconductor-based random access memory. A cellular switch generally uses random access memory to store data related to the service, features, status, and other characteristics for the cellular subscribers receiving service from that particular switch. These subscribers are referred to as "local" subscribers of the switch.

The random access memory of a switch is usually divided into a number of memory banks, with each bank comprising one or more computer cards and each card containing a number of random access memory integrated circuit chips. As an example, Motorola Inc. supplies a 4 megabyte random access memory card, model number SLN4166a, for use with Motorola brand cellular switches.

In addition to the random access memory, a cellular switch usually has one or more magnetic tape drives, such as the Cipher series 100 tape drive, which is supplied by Motorola under model number SLN5258a. The magnetic tape drives function with magnetic tapes having a width of 0.5 inches and a storage capability of 1600 bits per inch. The magnetic tape drives are a means for interfacing with or backing up the random access memory.

One of the databases used by a typical switch and stored in the random access memory is the subscriber database. The subscriber database contains basic information relating to the subscribers that are local to the switch. For explanatory purposes, this information may be categorized in terms of dynamic data and static data.

The dynamic data comprises information contained in the subscriber database that is subject to frequent modification. For example, the cellular subscribers that are local to a particular switch are provided with set of optional features related to their cellular service. These features are selectively enabled and disabled at the option of the cellular subscribers. The features that have been selected are called active features, and these features constitute a particular database called the active features database. The active features database is an example of the dynamic data of a cellular switch, and is stored in the switch's random access memory as part of the subscriber database.

Static data, on the other hand, consists of subscriber database information that is not subject to frequent modification, such as electronic serial numbers, mobile telephone numbers, and originating class of service.

The static data is stored in the random access memory of the switch and is additionally stored on a particular magnetic tape called the system generic tape. The system generic tape is updated by the switch in accordance with each change that occurs to the static data of the subscriber database stored in the random access memory. Therefore, the system generic tape provides a redundant copy of the static data of the subscriber database stored in the random access memory. Accordingly, when the static data of the subscriber database stored in random access memory changes due to an event, such as the activation of a new cellular subscriber that is local to the switch, the system generic tape is updated. At present, the operational system generic tape of a typical cellular switch is duplicated on a weekly basis by personnel who operate the switch, and the copy of the tape is placed in storage for backup purposes.

In contrast to the storage of the static data, the dynamic data is not stored on the system generic tape due to the frequent modifications that are performed on the dynamic data. Therefore, the dynamic data is stored exclusively in the switch's random access memory. For many purposes, this technique has been satisfactory.

However, there are a number of circumstances under which the data of a cellular switch can be lost. For example, the system generic tape is sometimes damaged or destroyed, thereby causing the static data of the subscriber database stored on the tape to be unusable. In order to recover from such a loss, the current procedure utilizes the most recently created backup system generic tape. Specifically, the defective system generic tape is removed from the magnetic drive to which the tape is attached, and the most recently created backup system generic tape is attached to the magnetic tape in replacement for the defective tape.

However, the most recently created backup tape may have been created as much as one week prior to its use in such a recovery procedure, since switch operators typically make new backup tapes on a weekly basis, as described hereinabove. Therefore, even after the replacement of the damaged system generic tape with the backup tape, the switch may not be able to operate properly since the subscriber database stored on the backup tape may be outdated with respect to the current, operative subscriber database contained in random access memory.

One method currently used in cellular operation to solve this problem involves the performance of a substantial number of manual tasks. In particular, an operator first uses a computer terminal, either located at the switch or at a remote location, to manually transmit switch-compatible print commands to the switch, in order to print the contents of the operative subscriber database contained in the switch's memory. Then, the operator manually removes the defective system generic tape from the magnetic tape drive to which it is attached and manually substitutes the backup system generic tape. Subsequently, the operator manually issues one or more software commands to the switch in order to cause the subscriber database of the backup tape to be loaded into the switch's memory. Then, the operator manually issues one or more switch-compatible print commands to the switch to cause the printing of the subscriber database that was loaded into the memory from the backup tape.

After the two subscriber databases have been printed as previously described, the operator manually compares the databases, subscriber by subscriber, in order to identify the subscribers for which the information of the databases differs.

Finally, in order to modify the subscriber database of the backup tape to match the subscriber database first printed from the memory, the operator manually issues a number of cellular switch-compatible software commands to the cellular switch. In particular, the operator issues one or more software commands to the switch for each cellular subscriber that was identified during the manual comparison process. These software commands function to change the subscriber database stored in the memory of the switch to match the operative contents of the subscriber database which was originally printed when the defect was first detected. In response to the modifications performed on the subscriber database of the memory, the subscriber database of the backup system generic tape is modified to properly duplicate the subscriber database stored in the memory.

Thus, by the use of a substantial number of manual tasks, a system generic tape having an operative subscriber database is created by updating the subscriber database of the backup system generic tape.

There are a number of limitations associated with this cumbersome method of recovery. First, manually comparing the subscriber databases of the switch's memory and the backup system generic tape is a time consuming process since a typical cellular switch is able to store data corresponding to nearly 20,000 subscribers. Likewise, a great deal of time is required in order to manually issue individual software commands to the switch for the purpose of updating the backup system generic tape. Therefore, a method is needed for automatically comparing the subscriber database of a cellular switch's memory with the subscriber database of the backup system generic tape, and automatically updating the backup tape according to the differences found by the comparison.

Another method that is currently used to modify the subscriber database of the backup system generic tape to be compatible with the operative subscriber database of the cellular switch's memory relates to the "subscriber audit data program". This program is included in several models of cellular switch manufactured by Motorola, and generally functions to compare the operative subscriber database of the switch's primary random access memory with a second subscriber database located in a secondary, typically redundant random access memory location. The program provides an output of discrepancies between the two subscriber databases.

The subscriber audit data program is sometimes utilized to assist in modifying the subscriber database of the backup tape to be compatible with the operative subscriber database of the switch's memory. First, an operator manually removes the system generic tape from the magnetic tape drive to which the tape is attached, and manually substitutes the backup tape therefor. Then, the operator issues one or more software commands to the switch in order to cause the switch to load the subscriber database of the backup tape into the secondary random access memory location of the switch. Subsequently, the operator instructs the switch to perform the subscriber audit data program, which functions to compare the operative subscriber database originally stored in a primary, operative memory location with the subscriber database loaded into the secondary memory from the backup tape.

The subscriber audit data program can be directed to provide an output of data such as that shown in Table I, shown hereinbelow with row numbers added for ease of explanation. Specifically, Table I displays data that is divided into a number of entries, each entry being associated with a mobile telephone number for which the subscriber audit data program determined that data of the primary and secondary memories differ. In each entry, the mobile telephone number is shown in the first row the entry. For example, rows 1-4 correspond to the mobile telephone number 5123967719, which appears in the right hand portion of row 1; similarly, rows 5-8 correspond to the mobile telephone number 5124610013 which appears in the right hand portion of row 5.

In each entry, the data of the primary memory corresponding to the mobile telephone number of that entry is found in the row preceded by the heading "ACT". For the purpose of clarity, these entries will be referred to as the "active" entries. As an example, row 3 contains an active entry. Similarly, in each entry the data of the secondary memory corresponding to the mobile telephone number of that entry is found in the row preceded by the heading "SBY". For the purpose of clarity, these entries will be referred to as the "standby" entries. As an example, row 4 contains as standby entry.

TABLE I

| Row | |
|---|---|
| 1 | *MC-MSG=LOCAL MISMATCH, MID=5123967719 |
| 2 | DX   FP CP. OC ST SER . . . OV TC EAD |
| 3 | ACT        15 000 18     D 8202C855 00 00 |
| 4 | SBY        15 000 00     D 8202C855 00 00 |
| 5 | *MC-MSG=LOCAL MISMATCH, MID=5124610013 |
| 6 | DX   FP CP.  OC ST SER . . . OV TC EAD |
| 7 | ACT        15 000 00     D A5077978 00 00 |
| 8 | SBY NOT FOUND |
| 9 | *MC-MSG=LOCAL MISMATCH, MID=5124610020 |
| 10 | DX   FP CP.  OC ST SER . . . OV TC EAD |
| 11 | ACT        15 000 00     870AF0A5 00 00 |
| 12 | SBY        15 000 00     86022BEE 00 00 |
| 13 | *MC-MSG=LOCAL MISMATCH, MID=5124610067 |
| 14 | DX   FP CP.  OC ST SER . . . OV TC EAD |
| 15 | ACT        16 000 00     D 81067E68 00 00 |
| 16 | SBY        16 000 00     D 8603D3AO 00 00 |
| 17 | *MC-MSG=LOCAL MISMATCH, MID=5124610101 |
| 18 | DX   FP CP.  OC ST SER . . . OV TC EAD |
| 19 | ACT NOT FOUND |
| 20 | SBY        15 000 00     D AE020562 00 00 |
| 21 | *MC-MSG=LOCAL MISMATCH, MID=5124610176 |
| 22 | DX   FP CP.  OC ST SER . . . OV TC EAD |
| 23 | ACT        18 000 11     D 85000B9E 00 00 |
| 24 | SBY        15 000 00     D 85000B9E 00 00 |
| 25 | DX   FP CP.  OC ST SER . . . OV TC EAD |
| 26 | ACT        16 000 00     810784E6 00 00 |
| 27 | SBY NOT FOUND |

TABLE I-continued

| 28 | *MC-MSG=LOCAL MISMATCH, MID=5124618544 |
| 29 | DX FP CP. OC ST SER ... OV TC EAD |
| 30 | ACT NOT FOUND |
| 31 | SBY 18 000 11 D 9202B27C 00 00 |
| 32 | *MC-MSG=LOCAL MISMATCH, MID=5124618555 |
| 33 | DX FP CP. OC ST SER ... OV TC EAD |
| 34 | ACT NOT FOUND |
| 35 | SBY 15 000 00 D A5075F98 00 00 |

As discussed hereinabove, the subscriber audit data program is equipped to compare the subscriber database of the primary memory to the backup system generic tape if the subscriber database of the tape is loaded into the secondary memory. However, the subscriber audit data program is not capable of automatically updating the subscriber database of the tape, since the program is limited to performing a comparison.

However, the subscriber audit data program can be utilized in conjunction with a number of manual tasks in order to modify the subscriber database of the backup tape to be compatible with the operative subscriber database of the switch's memory.

First, an operator manually attaches the backup system generic tape to a magnetic disk drive of the switch. Then, the operator issues software commands to the switch in order to cause the switch to load the backup tape's subscriber database into the switch's secondary random access memory location. Finally, the operator issues one or more software commands to the switch in order to instruct the switch to perform the subscriber audit data program, which functions to compare the operative subscriber database originally stored in the primary memory location with the subscriber database loaded into the secondary memory location from the backup tape.

There are a number of limitations to the use of the subscriber audit data program for this purpose. First, although the program can be used to provide a list of discrepancies between the original, operative subscriber database of the cellular switch's memory and the subscriber database of the backup system generic tape, the program has no means to update the subscriber database of the backup system generic tape to reflect the contents of the original subscriber database stored in memory. Therefore, a method is still needed to automatically update the backup system generic tape of a cellular switch based on the comparison performed by the subscriber audit data program.

Another limitation is that the technique cannot compare data in other databases such as the denied service database, since the comparison performed by the subscriber audit data program is limited to the subscriber database. As a result, comparison of data such a the denied service database is still required to be performed manually. Therefore, an improved method is needed to compare the denied service database contained in a cellular switch's memory with the denied service database contained in the backup system generic tape, and update the backup tape in accordance with the comparison.

In addition to the loss or destruction of the system generic tape, data of a cellular switch is sometimes destroyed when the cellular switch's memory is shut down and re-started. Such a shut-down procedure sometimes occurs even during the normal course of operations of the cellular switch. For example, the switch's memory must be turned off in order to install a new version of operating system software in the switch.

Since the dynamic data of the subscriber database is generally not contained on the system generic tape due to the frequency of modification of the dynamic data, the dynamic data is lost in the event the random access memory is shut down. The active features database, which is comprised of dynamic data, is similarly lost as a result of a memory shut down.

Presently, the method for avoiding the loss of the active features database as a result of a memory shut-down requires a switch operator to print the active features database prior to the shut-down of the switch's memory. Then, in order to re-install the active features database in the memory after the memory is restarted, the operator manually transmits to the switch one or more commands for each cellular subscriber contained in the active features database.

There are a number of disadvantages associated with this process. In particular, manually issuing individual commands to the switch in order to update the active features of each cellular subscriber is often a time consuming process since a typical cellular switch may have 2,000 cellular subscribers that have selected user-enabled features at one time. Therefore, an improved method is needed for automatically saving the active features database of a cellular switch's memory prior to a memory shut-down, and automatically re-loading the active features database into memory after the memory is re-started.

BRIEF SUMMARY OF INVENTION

The present invention concerns an improved method for updating data of a cellular switch. In particular, in the method of invention, the contents of a first database are automatically compared with the contents of a second database. Based on this comparison, a number of cellular switch-compatible instructions for modifying the second database to conform to the first database are compiled into a text file. The instructions of the text file are then transmitted to the cellular switch, thereby accomplishing the modification.

BRIEF DESCRIPTION OF DRAWINGS

FIG. 2 is a simplified flowchart of the overall operation of a subscriber database update program of the present invention.

FIG. 6 is a simplified flowchart of the overall operation of a denied service database update program of the present invention.

DETAILED DESCRIPTION OF INVENTION

Figure 1:
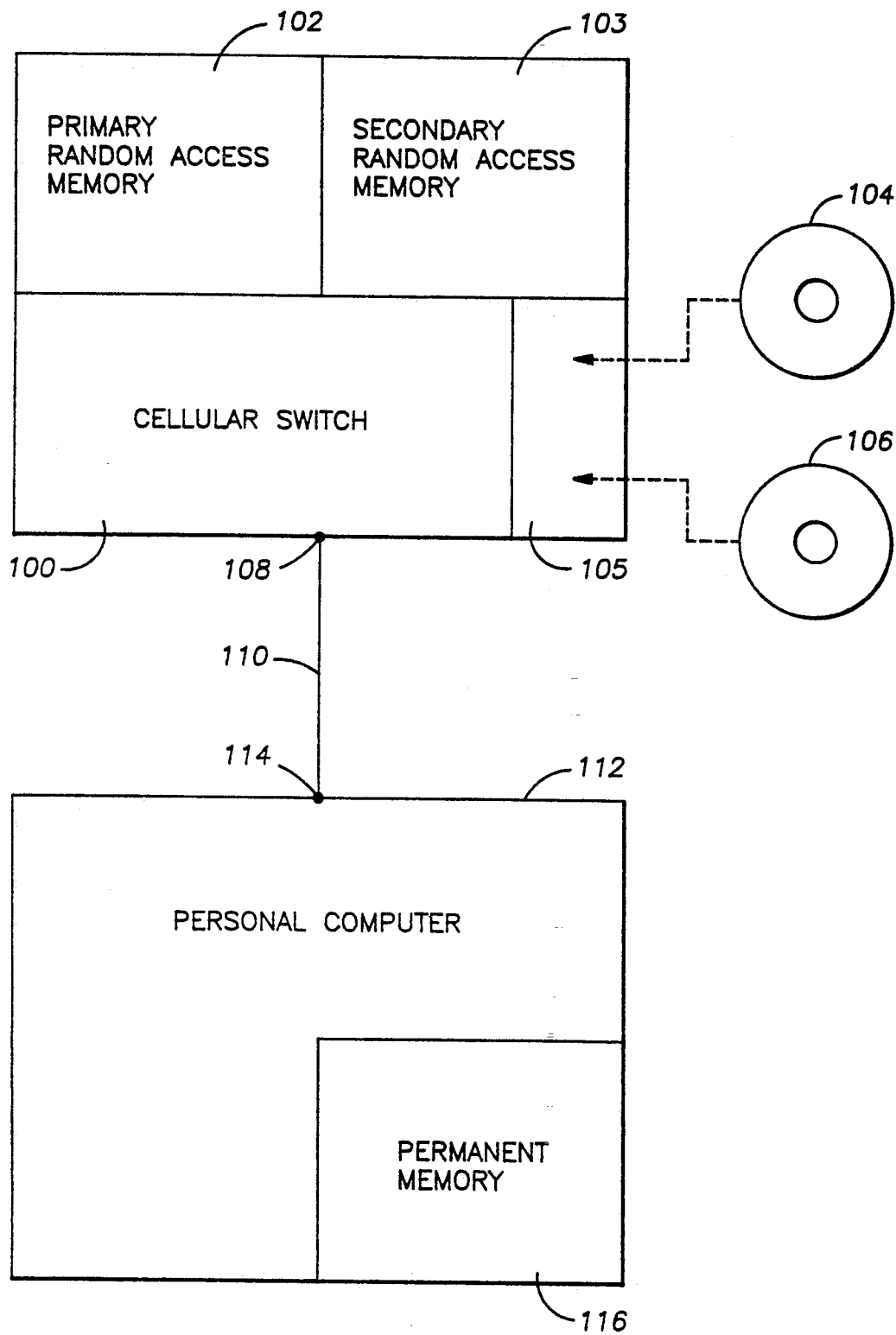
FIG. 1 is a drawing of the hardware interconnections of the system to which the present invention relates.

Referring now to the drawings, a preferred embodiment of the invention will be described. The invention generally provides a software utility program and method which is used in the event one or more particular databases of the system generic tape of a cellular switch are damaged, destroyed, or otherwise determined to be defective. More specifically, the invention comprises an improved method for updating particular databases of a backup system generic tape of a cellular switch so that the backup tape always can be used as an operative system generic tape.

Figure 3:
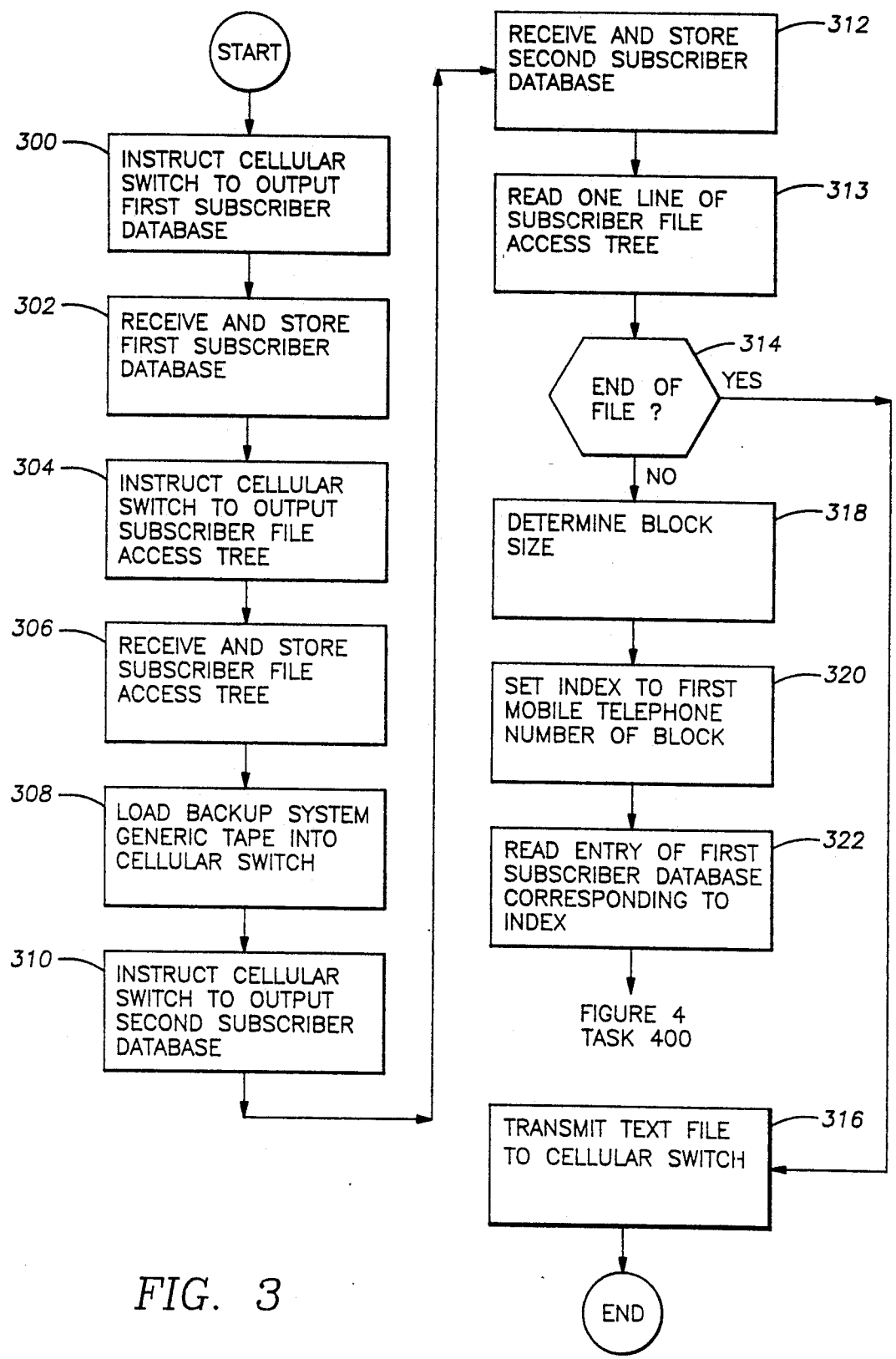
FIG. 3 is a simplified flowchart of the first part of a subscriber database update program of the present invention.
Figure 4:
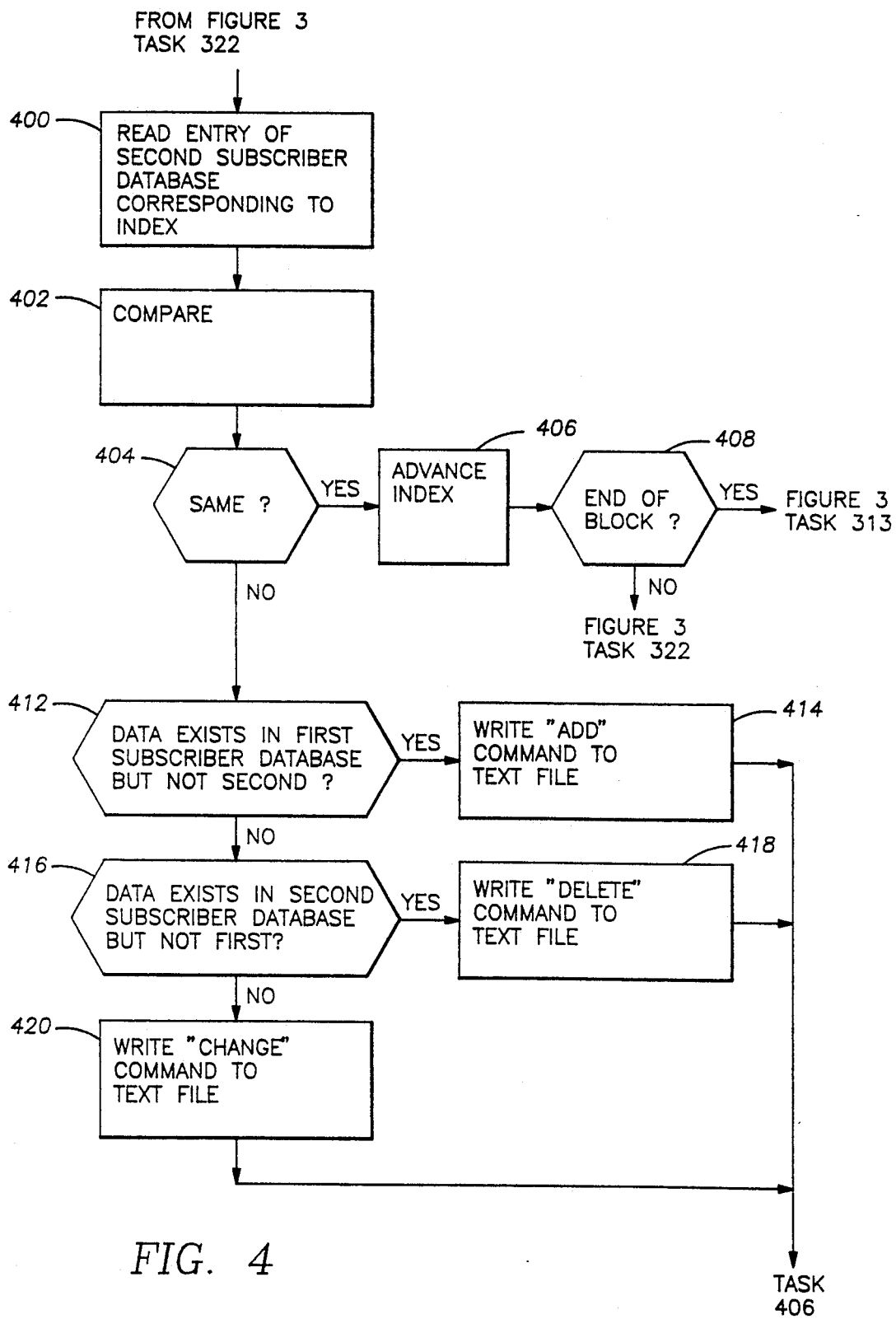
FIG. 4 is a simplified flowchart of the second part of a subscriber database update program of the present invention.
Figure 5:
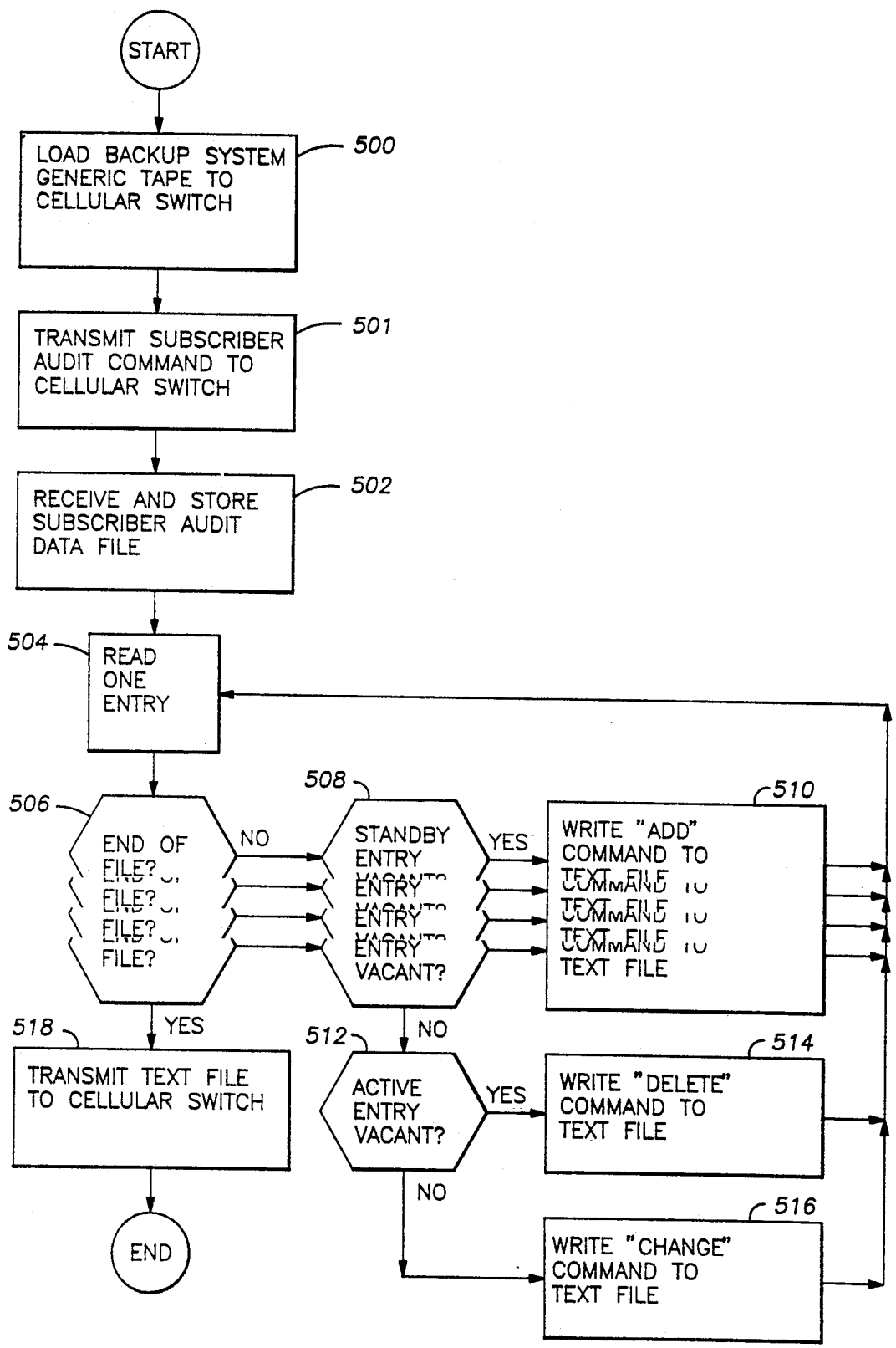
FIG. 5 is a simplified flowchart of an audit data update program of the present invention.
Figure 7:
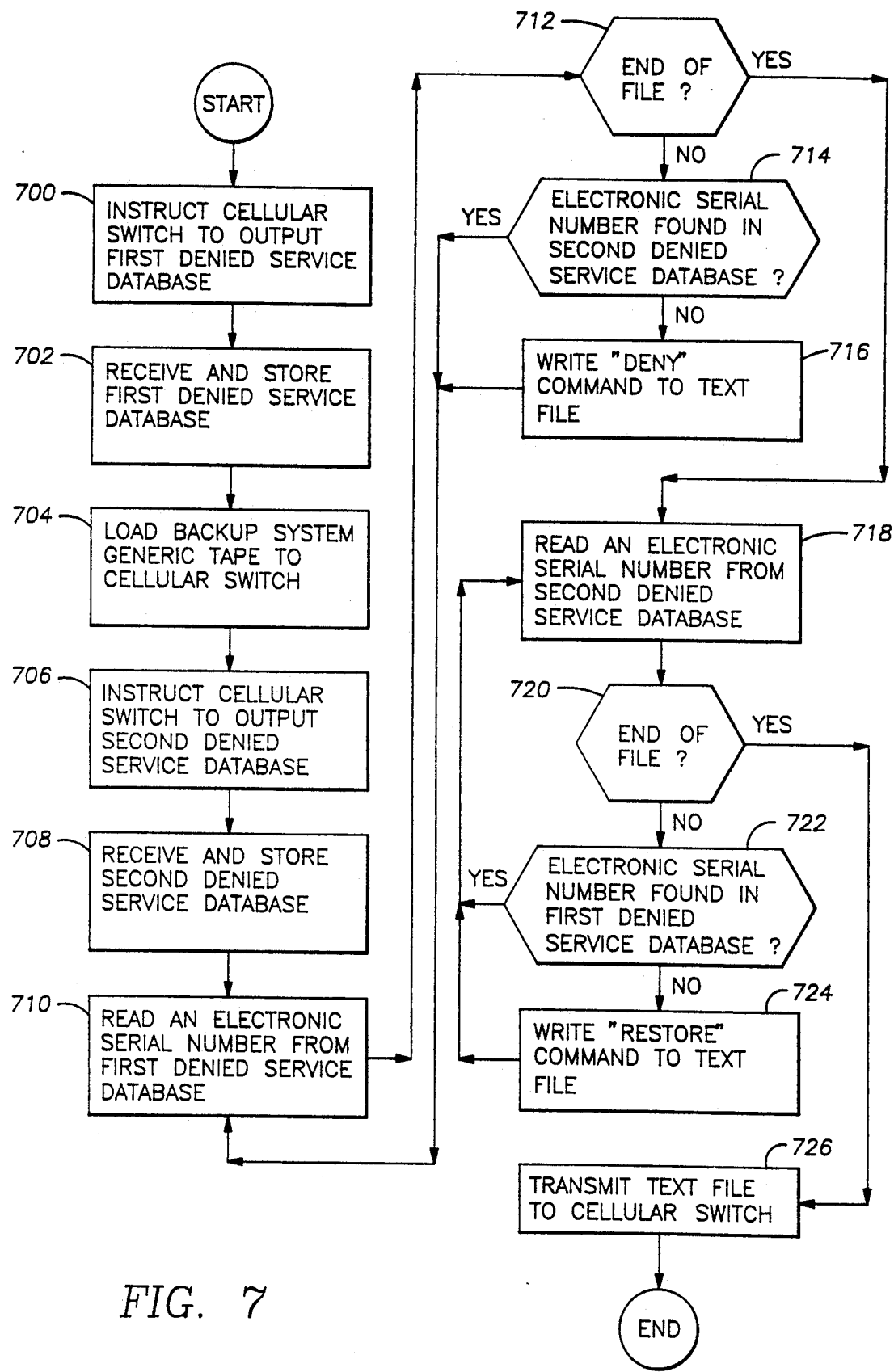
FIG. 7 is a simplified flowchart of a denied service database update program of the present invention.
Figure 8:
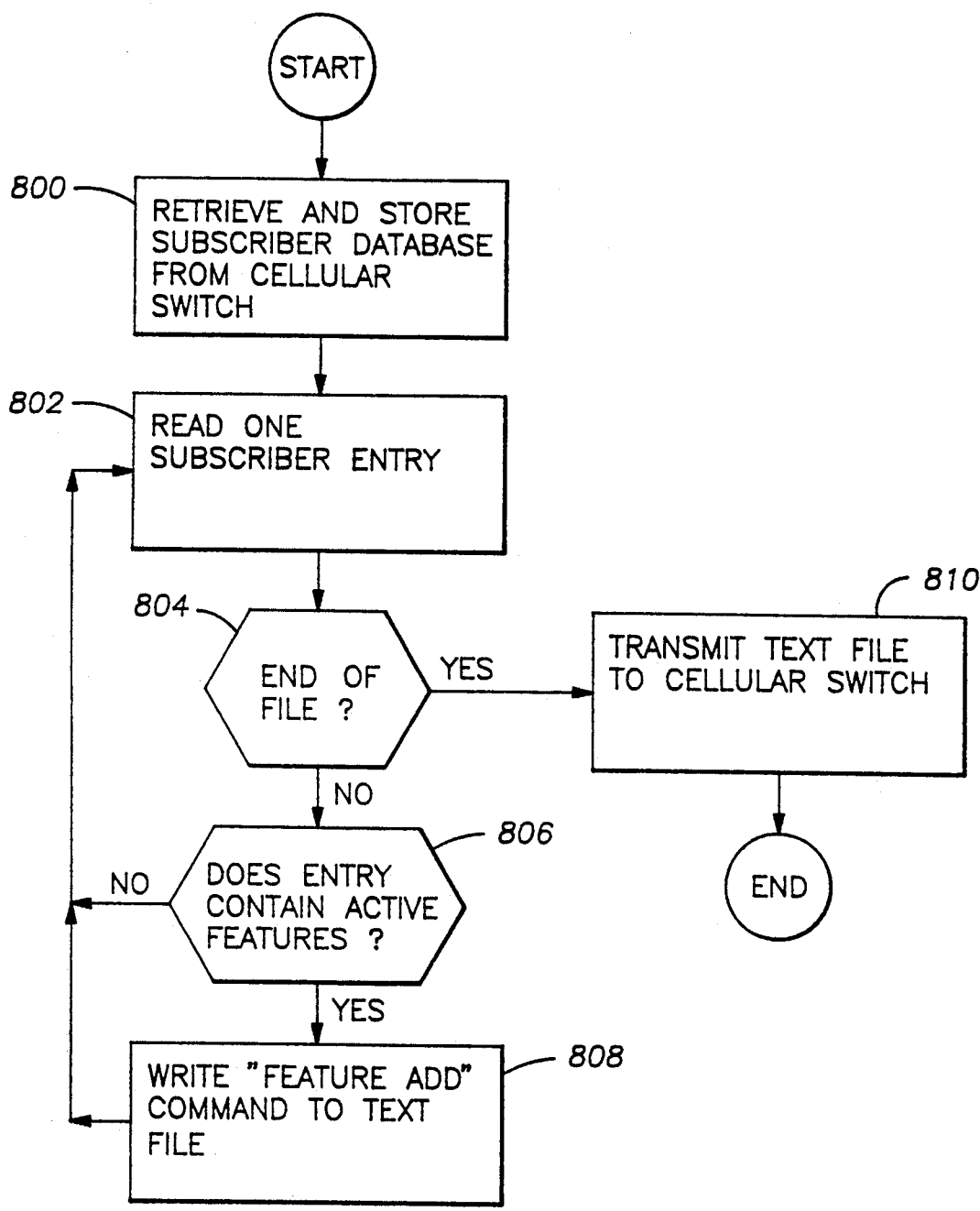
FIG. 8 is a simplified flowchart of an active features update program of the present invention.

The principle components of the method of the present invention include a subscriber database update program, shown in FIGS. 2, 3, and 4; a denied service database update program, shown in FIGS. 5 and 6; an audit data update program, shown in FIG. 7; and an active features update program, shown in FIG. 8.

Referring now to FIG. 1, the hardware components and interconnections used with the method will be described. A principal hardware component of the present invention is a cellular switch 100. In the preferred embodiment, the cellular switch 100 is a Motorola electronic mobile exchange such as a model EMX100, EMX100+, EMX250, or EMX500. The switch 100 has a primary random access memory 102 and a secondary random access memory 103. Memories 102 and 103 each comprise one or more memory banks. Each bank comprises one or more computer cards, wherein each card contains a number of random access memory integrated circuit chips. As an example, Motorola Inc. supplies a 4 megabyte random access memory card, model number SLN166a, for use with Motorola brand cellular switches.

In addition, the cellular switch has attached thereto one or more magnetic tape drives 105, such as a Cipher series 100 one half inch tape drive, which is supplied by Motorola under model number SLN5258a. Drives 105 include a system generic tape 104 and a backup system generic tape 106. The magnetic tape drives 105 provide a means of interfacing and backing up random access memories 102 and 103 with magnetic tape.

The switch 100 additionally includes a teletype port 108 for transmitting and receiving serial data. The port 108 is attached to a first end of a cable 110, that is interconnected with a personal computer 112 via a serial input/output port 114. The computer 112 typically additional includes a permanent memory 116 such as a hard disk drive or a tape backup.

During normal operation of the switch 100, the memory-related functions of the switch 100 are performed in the memory 102, with the memory 103 operating in a redundant capacity to the memory 102.

In addition to the memories 102 and 103, the switch 100 is adapted to frequently store portions of the data contained in memory 102 on the system generic tape 104, via one of the magnetic tape drives 105. The data of the system generic tape 104 is generally updated by the switch in accordance with each change that occurs to the corresponding data of the random access memory 102. Therefore, the system generic tape 104 functions as a redundant copy of the corresponding data of the subscriber database stored in the random access memory 102. As an example, when the subscriber database portion of the random access memory 102 changes due to an event such as the activation of a new cellular subscriber that is local to the switch 100, the operational system generic tape 104 is updated in response thereto. Furthermore, in a typical cellular switch, personnel who operate the switch 100 make an identical copy of the system generic tape 104 on a weekly basis. This tape is referred to as the backup system generic tape 106.

A number of software databases are stored within the memory 102. One of these databases is the subscriber database. The subscriber database is stored in the memory 102, and portions of the subscriber database are additionally stored on the tape 104. The subscriber database contains basic information about the cellular subscribers that are local to the switch 100.

A sample output of the subscriber database stored in the memory 102 is shown in Table II, with row and column numbers added for ease of explanation. In order to produce such an output, an operator uses a computer terminal, either located at the switch or at a remote location, to manually transmit a display command and a number of associated parameters to the switch 100. These parameters are used to specify which statistics of the cellular subscribers will appear in the output. Use of this display command and the parameters associated therewith, as well as other commands issued to the switch as discussed herein are more fully explained in the Subscriber Information Commands section of volume 3, book 2 of the EMX Operator's Input Message Manual, PN 68P81052E20, published by Motorola Inc. The aforementioned section of this manual is hereby incorporated by reference.

TABLE II

| Column 1 | 2 | 3 | 4 | 5 | 6 | 7 | 8 | 9 | 10 | 11 | 12 | 13 |
|---|---|---|---|---|---|---|---|---|---|---|---|---|
| 1 MID... | DXP | FP. | LKA | CP. | OC | ST | EMX | SER... | OV | TC | EAD | RL |
| 2 2194330000 | | 015 | 001 | 000 | 00 | D | 000 | 8201F592 | 00 | 00 | 000 | A |
| 3 2194330001 | | 015 | 001 | 000 | 00 | D | 000 | 82003FE9 | 00 | 00 | 000 | A |
| 4 2194330002 | | 015 | 001 | 000 | 00 | D | 000 | 82003891 | 00 | 00 | 000 | A |
| 5 2194330003-2194330014 | | | | VACANT SUBSCRIBER | | | | | | | | |
| 6 2194330015 | | 101 | 001 | 000 | 00 | | 000 | 00000000 | 00 | 00 | 000 | A |
| 7 2194330016 | | 100 | 001 | 000 | 00 | | 000 | 00000000 | 00 | 00 | 000 | A |
| 8 2194330017 | | 102 | 001 | 000 | 00 | | 000 | 00000000 | 00 | 00 | 000 | A |
| 9 2194330018-2194330024 | | | | VACANT SUBSCRIBER | | | | | | | | |
| 10 2194330025 | | 016 | 011 | 000 | 00 | D | 000 | 8A02D610 | 00 | 00 | 000 | A |
| 11 2194330026 | | 016 | 011 | 000 | 00 | D | 000 | 8A0264B0 | 00 | 00 | 000 | A |
| 12 2194330027 | | 015 | 001 | 000 | 01 | D | 000 | 85005A5C | 07 | 00 | 000 | A |
| 13 2194330028 | | 016 | 011 | 000 | 00 | D | 000 | 8A0276E5 | 00 | 00 | 000 | A |
| 14 2194330029 | | 016 | 011 | 000 | 00 | D | 000 | 98007EB3 | 00 | 00 | 000 | A |
| 15 2194330030 | | 015 | 011 | 000 | 00 | D | 000 | 8A00AF9E | 00 | 00 | 000 | A |
| 16 2194330031 | | 016 | 011 | 000 | 00 | D | 000 | 8A0242E9 | 00 | 00 | 000 | A |
| 17 2194330032 | | 016 | 011 | 000 | 00 | D | 000 | 8A02718C | 00 | 00 | 000 | A |

In Table II, a single cellular subscriber is identified by a mobile telephone number listed in column 1. In addition, each mobile telephone number has a row of data associated therewith, appearing in the columns to the right of the mobile telephone number. The data shown in Table II includes, for example, data relating to the feature package number, last known area, coverage package number, originating class-of-service, signaling type, and other attributes that are familiar to those having ordinary skill in the art of cellular telephony.

The data shown hereinabove in Table II is generally associated with information of the subscriber database that is infrequently modified, such as electronic serial numbers, mobile telephone numbers, originating class of service, and other statistics. Since this data is not subject to frequent change, it will be referred to as "static" data.

The static data is typically stored in the subscriber database of the system generic tape 104, in addition to the subscriber database of the memory 102. During the normal course of operation of the switch 100, the subscriber database of the system generic tape 104 is automatically updated by the switch 100 in accordance with each change that occurs to the static data of the subscriber database stored in the random access memory 102. Therefore, the system generic tape 104 functions as a redundant copy of the static data of the subscriber database stored in the random access memory 102. As an example, when the subscriber database of the random access memory 102 changes due to an event such as the activation of a new cellular subscriber that is local to the switch 100, the system generic tape 104 is automatically updated in response thereto.

In addition to the static data shown hereinabove in the output of Table II, the subscriber database contains dynamic data. Typically, the cellular subscribers that are local to a particular switch are provided with a set of optional features related to their cellular service. These features are selectively enabled and disabled at the option of the cellular subscribers. The features that have been selected are called active features, and a database of active these features is stored in the cellular switch's memory as part of the subscriber database. This database is referred to as the active features database, and since these features are selectively enabled and disabled at the option of the cellular subscribers, the active features database is subject to frequent modification.

Accordingly, the switch 100 does not store the active features database on the system generic tape 104 due to the frequent modifications that are performed on the active features database. Therefore, the dynamic data is stored exclusively in the switch's random access memory.

Another software database of the switch 100 is the denied service database, a sample output of which is shown in Table III. The denied service database contains various information relating to cellular telephones for which cellular service has been discontinued. Customarily, cellular service may be discontinued by the cellular carrier for a number of reasons such as the failure of a customer to pay his/her cellular telephone bill, the theft of a cellular telephone, or other similar reasons. Accordingly, the denied service database is not subject to frequent modification. Thus, the denied service database is stored in the memory 102, and is additionally duplicated on the system generic tape 104.

In order to produce an output of the denied service database stored in memory 102, an operator issues a display command and a number of associated parameters to the switch 100. These parameters are used to specify the attributes of the cellular subscribers that will appear in the output. As shown in Table III, an output can be specified containing every electronic serial number for which cellular service has been denied.

TABLE III

| 8801AC01 | 9E069001 | 88000002 | 88021402 | 8E052002 | 9E069002 |
|---|---|---|---|---|---|
| A501EC02 | 821B4403 | AE052003 | 8801B804 | 9E052004 | 9E069004 |
| 82079C05 | A507AC05 | 821EE407 | 86038807 | 8801B807 | 9E036007 |
| AE052007 | AE08A007 | 820A6008 | 9E056008 | AE03A008 | AE08A008 |
| 82055C09 | AE07A009 | 8206100A | 9E06900A | A504400A | 84005C0B |
| A505240B | 820A700C | 8701900D | 8202B80E | 8205E411 | 8E067011 |
| 8E093011 | 81079812 | 86037C12 | 8E079012 | 8E0AA012 | 8E047013 |
| 8E051013 | 8E052013 | 8E061013 | 8E081013 | 8E025014 | 8E062014 |
| SE083014 | 8E0AA014 | 9E0A4014 | 8203D415 | 8214C815 | 8A09B015 |
| 8E016015 | 8E038015 | 8E06A015 | 8E074015 | 8E092015 | 8E096015 |
| A5049415 | 8E025016 | 8E037016 | 8E072016 | 8801C817 | A504EC17 |
| AE09S017 | 8E023018 | 8E032018 | 8E061019 | 8602481C | 8811B81C |
| 8A06C41C | 8202B81E | 8606001E | A500501E | 8203F01F | 86066020 |
| 8209D021 | 8E011021 | 8E099021 | 82054022 | 8E024022 | 8E029022 |
| 8E038022 | 8E0A7022 | 9E0A7022 | 8A06A423 | 8E051023 | 8E061023 |
| 8E015024 | 8E025024 | 8E062024 | 8E0A7024 | 9E0A4024 | 82085C25 |

Having described the various databases stored in the switch 100, the subscriber database update program of the present invention will now be described. The subscriber database update program includes a number of BASIC programming lines, which are shown in order of execution in Table IV hereinbelow. The program is stored and executed by the personal computer 112.

Generally, the subscriber database update program is used as a utility program in the event the subscriber database of the system generic tape 104 is damaged, or destroyed, or otherwise determined to be defective. Specifically, the subscriber database update program is used to modify the subscriber database stored on the backup system generic tape 106 so that the tape 106 always can be used as an operative backup to the system generic tape 104. The program automatically accomplishes this by comparing the subscriber database of the memory 102 with the subscriber database of the backup take 106, and adding, deleting, or changing entries of the subscriber database of the backup tape 106 in accordance with the comparison.

FIG. 2 is a simplified flow chart of the overall operation of the subscriber database update program of the present invention. In task 200 the computer 112 retrieves the contents of the operative subscriber database from the memory 102 of the switch 100. In task 202, the system generic tape 104 is removed from the magnetic tape drive 105 to which the tape 104 is attached and the backup tape 106 is substituted therefor. Also in task 202, the subscriber database of the backup tape 106 is loaded into the memory 102, thereby displacing the previous contents of the memory 102. Then, in task 204, the computer 112 retrieves from the memory 102 the subscriber database which was loaded into the memory 102 in task 202.

Task 206 then determines the differences between the contents of the first-retrieved and second-retrieved subscriber databases. In task 208, software commands corresponding to the differences determined in task 206 are written to a text file. These software commands are compatible with the switch 100, and, upon issuance to the switch 100 in task 210, function to update both the memory 102 and the currently loaded tape 106 in accordance with the differences determined in task 206.

Referring now to FIGS. 3 and 4, the subscriber database update program will be described in greater detail. In task 300, the computer 112 issues one or more software commands to the switch 100 instructing the switch 100 to provide at the port 108 an output of the subscriber database from the memory 102. For purposes of clarity, this database will be referred to as the first subscriber database. Next, in task 302, the computer 112 receives the first database at the port 114 and stores the first database in the permanent storage 116 of the computer 112.

Task 304 then instructs the switch 100 to provide an output of the subscriber file access tree at the port 108. The subscriber file access tree contains a list of all mobile telephone numbers which have been designated for present or future use by the switch 100. Typically, a cellular carrier updates the subscriber file access tree when the local telephone company allocates additional telephone numbers for use of the carrier. A sample output of the subscriber file access tree is shown in Table V, with row and column numbers added for ease of explanation.

The subscriber file access tree is more fully explained on pages 5-205 through 5-207 of volume 3, book 2 of the EMX Operator's Input Message Manual System Recent Change Commands, PN P81053E34, published by Motorola Inc. The aforementioned pages are hereby incorporated by reference.

TABLE V

|  | Column 1 | Column 2 |
| --- | --- | --- |
| Row 1 | SF=SFT,MOBILE=2194330000 | |
| 2 | SF=SFT,MOBILE=2194330010 | |
| 3 | SF=SFT,MOBILE=2194330020 | |
| 4 | SF=SFT,MOBILE=2194330030 | |
| 5 | SF=SFT,MOBILE=2194330040 | |
| 6 | SF=SFT,MOBILE=2194330050 | |
| 7 | SF=SFT,MOBILE=2194330060 | |
| 8 | SF=SFT,MOBILE=2194330070 | |
| 9 | SF=SFT,MOBILE=2194330080 | |
| 10 | SF=SFT,MOBILE=2194330090 | |
| 11 | SF=SFH,MOBILE=2194330100 | |
| 12 | SF=SFH,MOBILE=2194330200 | |
| 13 | SF=SFH,MOBILE=2194330300 | |
| 14 | SF=SFH,MOBILE=2194330400 | |
| 15 | SF=SFH,MOBILE=2194330500 | |
| 16 | SF=SFH,MOBILE=2194330600 | |
| 17 | SF=SFH,MOBILE=2194330700 | |
| 18 | SF=SFH,MOBILE=2194330800 | |

In Table V, each row corresponds to an allocated block of mobile telephone numbers. In each row, the entry located in column 1 indicates the size of a particular block of allocated telephone numbers, and the entry located in column 2 indicates the first mobile telephone number in the allocated block. For example, in row 1, column 1 "SF=SFH" indicates that a block of one-hundred numbers have been allocated, and in row 1, column 2 "MOBILE=0808281800" signifies that the first mobile telephone number of the block is 828-1800. As another example, in line 3 "SF=SFT" indicates that a block of ten numbers have been allocated, and "MOBILE=0808927980" signifies that the first mobile telephone number of the block is 892-7980.

Following task 304, the computer 112 receives the subscriber file access tree at port 114 and stores the file in the permanent storage 116.

Then, in task 308, the system generic tape 104 is removed from the magnetic tape drive 105 to which the tape 104 is attached, the backup system generic tape 106 is substituted therefor, and the tape 106 is loaded into the memory 102, thereby displacing previous contents of the memory 102. In task 310 the computer 112 issues one or more software commands to the switch 100 instructing the switch 100 to provide an output at the port 108 of the subscriber database that was loaded into the memory 102 in task 308. Then, in task 310, the computer 112 receives at the port 114 the output provided by the switch 100 pursuant to the instruction of task 310. For purposes of clarity, this database will be referred to as the second subscriber database.

After task 312, task 313 causes one row of the subscriber file access tree to be read by the computer 112. Query 314 determines whether the end of the subscriber file access tree file has been reached.

In the event the answer to query 314 is negative, task 318 determines the size of the block of allocated mobile telephone numbers specified by the row read in task 313. Then, task 320 sets an index marker in software to correspond to the first mobile telephone number in the allocated block, so that the program can examine the entries of the subscriber databases corresponding to each mobile telephone number in the block in an organized manner by advancing the index marker through the numbers of the block.

Next, in task 322, the entry of the first subscriber database corresponding to the cellular telephone number of the index marker is read. Referring now to FIG. 4, after performance of task 322 of FIG. 3 is performed, task 400 occurs. In task 400, the entry of the second subscriber database corresponding to the index marker is read.

Then, task 402 compares the entries of the first and second subscriber databases which were read in tasks 322 and 400. Query 404 determines whether these entries are the same.

If the entries are equivalent, task 406 advances the index marker to the next mobile telephone number in the current block of numbers. After task 406, query 408 determines whether task 406 advanced the index marker to the end of the block.

If the answer to query 408 is negative, control of the program advances to task 322 of FIG. 3, wherein the entry of the first subscriber database corresponding to the index marker is read. However, if the answer to query 408 is affirmative, control of the program passes to task 313 of FIG. 3, wherein a new line of the subscriber file access tree is read.

However, if query 404 has determined that the compared entries are different, then query 412 executes, rather than task 406. Query 412 determines whether an entry corresponding to the indexed mobile telephone number exists in the first subscriber database, but not in the second subscriber database. If the answer to query 412 is affirmative, task 414 writes an "add" command and the entry of the first subscriber database corresponding to the indexed mobile telephone number to a text file. Upon transmittal to the switch 100, described hereinbelow in relation to task 316, the add command functions to add the entry corresponding to the indexed mobile telephone number to the memory 102. After task 414, control passes to task 406 in which the index is advanced to the next mobile telephone number.

On the other hand, if the answer to query 412 is negative, query 416 executes, causing a determination to be made whether an entry corresponding to the indexed mobile telephone number exists in the second subscriber database, but not in the first subscriber database. If the answer to query 416 is affirmative, task 418 writes a "delete" command in conjunction with the entry of the second subscriber database corresponding to the indexed mobile telephone number to the text file. Upon transmittal to the switch 100, as described in relation to task 316, the delete command functions to delete the entry corresponding to the indexed mobile telephone number from the memory 102. After task 418, control passes to task 406 in which the index is advanced to the next mobile telephone number.

However, if the answer to query 416 is negative, task 420 executes. In task 420, a "change" command is written to the text file. Upon transmittal to the switch 100, as described in relation to task 316, the change command functions to change the entry in the memory 102 corresponding to the indexed mobile telephone number to the entry of the first database corresponding to the indexed mobile telephone number. After task 420, control passes to task 406 in which the index is advanced to the next mobile telephone number.

After every block of mobile telephone numbers in the subscriber file access tree has been processed as described hereinabove, the end of the file is detected by query 314, and task 316 is executed. Task 316 sends the text file which was constructed in tasks 414, 418, and 420 to the switch 100, thereby updating the contents of the memory 102 and the backup system generic tape 106 to match the contents of the memory 102 which was obtained in task 302. Thus, the program modifies the backup system generic tape 106 in order to create a current system generic tape.

Consequently, the subscriber database update program of the present invention automatically operates as a utility program that modifies the subscriber database of the backup system generic tape 106 so that the tape 106 will always function as the operative system generic tape, in substitution for the system generic tape 104, if the latter tape determined to contain a defective subscriber database.

The audit data update program of the present invention will now be described. This program utilizes the output produced by the subscriber audit data program in order to automatically update the tape 106. In particular, the audit data update program utilizes the subscriber audit data program in order to compare the contents of the subscriber database of the memory 102 to the subscriber database of the backup tape 106 which has been loaded into the memory 103. Then, the audit data update program automatically creates a text file containing a number of cellular switch-compatible software commands that are based upon the comparison performed by the subscriber audit data program. The audit data update program automatically transmits the text file to the switch 100, thereby updating the contents of the memory 102 and the backup tape 106 to match the original, operative contents of the memory 102. The audit data update program contains a number of BASIC programming lines, which are shown in the order of execution in Table VII hereinbelow.

Referring now to FIG. 5, the audit data update program will be described in greater detail. In task 500, an operator of the switch 100 manually removes the system generic tape 104 from the magnetic tape drive 105 to which the tape 104 is attached, and manually substitutes the backup tape 106 therefor. Also in task 500, the operator instructs the switch 100 to load the backup tape 106 into the random access memory 103. Then in task 501, the operator issues one or more software commands to the switch 100 in order to initiate the subscriber audit data program. In task 502, the port 114 of the computer 112 receives the output of the subscriber audit program from the switch 100.

Then, task 504 reads a complete entry of the subscriber audit program output corresponding to a single mobile telephone number. Query 506 then determines whether the end of the output was reached in task 504. If the answer to query 506 is negative, Query 508 determines whether the standby entry read in task 504 contains "NOT FOUND". If the answer to query 508 is affirmative, then the subscriber databases of backup tape 106 and the memory 103 do not contain any data corresponding to the mobile telephone number of the entry read in task 504, while the subscriber database of the memory 102 does contain data corresponding the entry.

In this case, task 510 writes an "add" command in conjunction with the data from the active entry to a text file. Upon transmittal to the switch 100, as described hereinbelow in relation to task 518, the add command will cause data from the active entry to be added to the subscriber database of the memory 103, thereby updating the backup tape 106 accordingly.

However, if the answer to query 508 is negative, query 512 determines whether the active entry read in task 504 is "NOT FOUND". If the answer to query 512 is affirmative, then the subscriber database of the memory 102 does not contain any data corresponding to the mobile telephone number of the entry read in task 504, while the subscriber databases of the backup tape 106 and the memory 103 do contain data corresponding to the entry. In this case, task 514 writes a ⊖delete" command in conjunction with the mobile telephone number to a text file. Upon transmittal to the switch 100, as described hereinbelow in relation to task 518, the delete command will cause data corresponding to the mobile telephone number of the entry read in task 504 to be deleted from the subscriber database of the memory 103, thereby updating the backup tape 106 accordingly.

However, if the answer to query 512 is negative, indicating that active and standby entries read in task 504 do exist but differ from each other, task 516 is performed. Task 516 writes a "change" command in conjunction with the data from the active entry to a text file. Upon transmittal to the switch 100, as described hereinbelow in relation to task 518, the change command will delete data of the subscriber database of the memory 103 corresponding to the standby entry, and add data from the active entry in substitution therefor, thereby updating the backup tape 106 accordingly.

The sequence described hereinabove is repeated until query 506 determines that the end of the subscriber audit data has been reached, whereupon task 518 is executed. Task 518 sends the text file constructed in tasks 510, 514, and 516 to the switch 100, thereby updating the memory 103 and the backup system generic tape 106 to match the contents of the memory 102. Thus, the subscriber audit update program modifies subscriber database of the backup system generic tape 106 based on the output from the subscriber audit data program, in order to provide the switch 100 with an operative system generic tape.

In summary, the audit data update program of the present invention operates as a utility tool that assists in creating an operational system generic tape 104 in the event the subscriber database of the system generic tape 104 is determined to be defective. Prior to executing the audit data update program, an operator first executes the subscriber audit data program in order to compare the subscriber database of the memory 102 with the subscriber database of the backup system generic tape 106 that has been manually loaded into the memory 103. Then, the operator executes the audit data program of the present invention, which utilizes the output of the subscriber audit data program to generate a number of switch-compatible software commands. The audit data update program transmits the software commands to the switch 100, thereby causing the switch 100 to update the backup tape 106 accordingly.

Reference is now made to FIG. 6, which is a simplified flowchart of the overall operation of the denied service database update program of the present invention. The denied service database update program contains a number of BASIC programming lines, which are shown in order of execution in Table VI hereinbelow.

Generally, the denied service database update program is used as a utility tool in the event the denied service database of the system generic tape 104 is damaged, destroyed, or otherwise determined to be defective. Specifically, the denied service database update program is used to modify the denied service database of the backup system generic tape 106 so that the tape 106 can be used as a fully operational system generic tape. The program accomplishes this by comparing the operative denied service database of the memory 102 with the denied service database of the backup tape 106, and adding or deleting entries of the denied service database of the backup tape 106 in accordance with the comparison.

In task 600, the computer 112 retrieves the contents of the denied service database from the random access memory 102 of the switch 100. In task 602, the system generic tape 104 is removed from the magnetic tape drive 105 to which the tape 104 is attached, and the backup tape 106 is substituted therefor. Also in task 602, the denied service database of tape 106 is loaded into the memory 102, thereby displacing previous contents of the memory 102. Then, task 604 retrieves the contents of the denied service database from the memory 102 of the switch 100.

Task 606 then determines the differences between the contents of the first-retrieved and second-retrieved denied service databases. In particular, task 606 identifies data entries which appear in the first-retrieved database but not in the second, and those which appear in the second-retrieved database but not in the first. In task 608, software commands corresponding to the differences determined in task 606 are written to a text file. These software commands are compatible with the switch 100, and function to update both the memory 102 and the backup system generic tape 106 in accordance with the differences determined in task 606, upon issuance to the switch 100 in task 610. Specifically, these commands function to add to the memory 102 those data entries that were found in the first-retrieved database but not in the second, and delete from the memory 102 those data entries that were found in the second-retrieved database but not in the first. Thus, the contents of the memory 102, as well as the backup system generic tape loaded into the switch, are made current.

Referring now to FIG. 7, the denied service database update program of the present invention is described in greater detail. In task 700, the computer 112 issues one or more software commands to the switch 100 instructing the switch 100 to provide at the port 108 an output of the denied service database from the memory 102. Then, in task 702, the computer 112 receives at the port 114 the output provided by the switch 100 pursuant to the instruction of task 700. For purposes of clarity, the database received in task 702 will be referred to as the first denied service database.

Then, in task 704, the system generic tape 104 is removed from the magnetic tape drive 105 to which it is attached, and the tape 106 is substituted therefor. Also in task 704, the backup system generic tape 106 is loaded into the memory 102, thereby displacing the previous contents of the memory 102. In task 706 the computer 112 issues one or more software commands to the switch 100 instructing the switch 100 to provide at the port 108 an output of the subscriber database from the memory 102. Then, in task 708, the computer 112 receives at the port 114 the output provided by the switch 100 pursuant to the instruction of task 706. For purposes of clarity, the database received in task 708 will be referred to as the second denied service database.

After execution of task 708, task 710 causes one entry of the first denied service database to be read. As described hereinabove with respect to Table III, each entry of the denied service database comprises a single electronic serial number for which cellular service has been denied. Query 712 then determines whether the end of first denied service database has been reached.

If the end of the first denied service database has not been reached, query 714 determines whether the electronic serial number read in task 710 is found in the second denied service database. If the answer to query 714 is affirmative, the program returns to task 710 wherein another electronic serial number is read from the first denied service database.

However if the answer to query 714 is negative, then task 716 writes a "deny" command and the electronic serial number read in task 710 to a text file. Upon issuance to the switch 100, as described hereinbelow in relation to task 726, the deny command will instruct the switch to deny service for that particular electronic serial number. As a result, the electronic serial number will be stored in the denied service databases of the memory 102 and the backup system generic tape 106, which was installed in the switch 100 in task 704.

After task 716 executes, control of the program returns to task 710 wherein another electronic serial number of the first subscriber database is read. The sequence performed by task 710, query 712, query 714, and task 716 continues until query 712 determines that the end of the first denied service database has been reached.

When query 712 detects the end of the first desired service database, the program advances to task 718 which reads an electronic serial number from the second denied service database. Query 720 then determines whether the end of the second denied service database has been reached. If the answer to query 720 is negative, query 722 determines whether the entry read in task 718 is found in the first denied service database. If the answer to query 722 is affirmative, control of the program returns to task 718 wherein another entry of the second denied service database is read.

However, if the answer to query 722 is negative, then task 724 writes a restore command and the electronic serial number found in task 718 to a text file. Upon issuance to the switch 100, as described hereinbelow in relation to task 726, the restore command will instruct the switch to cancel the denied-service status of the electronic serial number read in task 718. As a result, the electronic serial number will be deleted from the denied service databases in the memory 102 and the backup system generic tape 104, which was installed in the switch 100 in task 704.

The sequence of task 718, query 720, query 722, and task 724 as described hereinabove is continued until query 720 determines that the end of the second denied service database has been reached. Then, task 726 sends the text file which was constructed in tasks 716 and 724 to the switch 100, thereby updating the denied service database of the memory 102 and the backup system generic tape 106.

Consequently, the denied service database update program of the present invention operates as a utility program that modifies the denied service database of the backup system generic tape 106 in accordance with the contents of the operative denied service database of the memory 102, so that the tape 106 will always function as an operative system generic tape, in substitution for the system generic tape 104 if the latter tape is determined to contain a defective denied service database.

The active features update program of the present invention will now be described. The primary purpose of the active features update program is to capture the contents of the active features database of the switch 100 and re-load the database to the switch 100 or a different switch.

The active features update program is useful in a number of circumstances, including conditions under which the memory 102 is to be shut down and restarted. Such a shut-down of memory is required when a new version of operating system software is installed in the switch 100. As a result of a memory shut-down, the contents of the memory 102, including the active features database, are destroyed. The active features update program can be used to prevent this problem, by storing the contents of the active features database of the memory 102 prior to the memory shut-down, and subsequently restoring the database to the memory 102 after the memory is re-started.

Another circumstance under which the active features update program is useful is the transfer of the active features database from the memory 102 of the switch 100 to the memory of a separate, target switch, not shown. In this case, the static data of the subscriber database can be transferred to the target switch by performing the steps of manually removing the system generic tape 104 from the switch 100, attaching the tape 104 to one of the magnetic disk drives of the target switch, and loading the tape 104 into the target switch's memory. However, since the active features database is not stored on the system generic tape 104, the above-mentioned method of transfer fails to transfer the active features database. The active features update program of the present invention can be used to prevent this problem by storing the contents of the active features database of the memory 102 and subsequently installing the database to the memory of the target switch.

For ease of understanding, the installation of the database in the memory 102 of the switch 100, rather than the memory of a separate target switch, will be discussed herein.

The active features update program contains a number of BASIC programming lines, which are shown in order of execution in Table VIII hereinbelow. In order to describe the operation of the active features update program in greater detail, reference will now be made to FIG. 8. In task 800, the computer 112 issues one or more software commands to the switch 100 instructing the switch 100 to provide at the port 108 an output of the subscriber database from the memory 102 of the switch 100. Then, task 802 reads data corresponding to a single mobile telephone number from the database. Query 804 determines whether the end of the database has been reached.

If the end of the database has not been reached, then query 806 determines whether the data read in task 802 contains any active features. If the answer to query 806 is negative, control of the program returns to task 802 wherein data corresponding to a different mobile telephone number is read from the subscriber database.

However, if the answer to query 806 is affirmative, task 808 writes a "feature addition" command to a text file. Upon transmittal to a switch, as described hereinbelow in relation to task 810, the feature addition command will add the active feature found in task 806 to the 102 of the switch 100 memory. After task 808, control of the program returns to task 802.

The sequence represented by task 802, query 804, task 806, and task 808 is repeated until query 804 determines that the end of the subscriber database has been reached. Then, task 810 sends the text file constructed in task 808 to the switch 100, thereby updating the memory 102 with the active features found in query 806. Alternatively, it is contemplated that task 810 could send the text file created in task 808 to a switch other than the switch 100 for installation of the active features database in the memory of that switch.

Consequently, the active features update program of the present invention operates as a utility tool that functions to store the contents of the active features database of the memory 102 and restore the active features database to the memory of the switch 100 or to a different switch 100.

The present invention affords a number of advantages to the users thereof. Unlike prior programs, the present invention updates the denied service database of the switch 100. As a result, loss of the denied service database from the system generic tape 104 can be easily recovered without the necessity for lengthy, time consuming manual entry of the data. Thus, one advantage of the present invention is that it updates the denied service database of the switch 100 with a high degree of automation.

Still another advantage of the present invention is that the program is able to preserve the active features database of the switch 100. The invention is able to retrieve the active features database from the memory 102 of the switch 100 and install the database in the memory of a different switch or, alternatively, re-install all the database in the memory 102 without the performance of extensive manual operations. Therefore, an advantage of the present invention is that it is able to restore or transfer the active features database of the memory 102 with a high degree of automation.

Another advantage of the present invention is that it updates the subscriber database of the backup system generic tape 104. Unlike prior methods, which were limited to comparing the backup system generic tape 106 with the memory 102 and manually updating the tape 106 in response to the comparison, the present invention accomplishes the tasks of comparing and updating the tape 106 by using a highly automated computer program. Thus, an advantage of the present invention is that it automatically updates the subscriber database of a backup system generic tape 106.

An alternative embodiment of the subscriber database update program of the present invention is additionally contemplated. Specifically, this embodiment is used in the event the subscriber database of the system generic tape has only suffered slight damage. In this procedure, the backup tape 106 is not utilized.

In particular, task 200 is unchanged in this alternate embodiment, so that the computer still retrieves the contents of the operative subscriber database of the memory 102. However, in task 202 the defective subscriber database of the tape 104 is loaded into the memory 102, instead of the backup system generic tape 106.

As a result, task 206 compares the contents of the original operative subscriber database of the memory 102 with the defective subscriber database of the tape 104. Moreover, task 210 then causes the subscriber database of the system generic tape 104, rather than the subscriber database of the backup tape 106, to be updated in accordance with the comparison of task 206.

Thus, the defective subscriber database of the system generic tape 104 is compared to the original, operative subscriber database of the memory 102, and the tape 104 is updated in accordance with the comparison.

This alternative embodiment is primarily used in the event the damage to the subscriber database of the tape 104 is slight. Specifically, if the subscriber database of the tape 104 has only been slightly damaged, this database will not differ substantially from the subscriber database of the operative memory 102 of the switch 100. Since these differences are minimal, the computer 112 will require less time to compare the operative subscriber database of the memory 102 to the damaged subscriber database of the tape 104 in task 206.

On the other hand, if the subscriber database of the tape 104 has been substantially damaged, this database will differ substantially from the operative memory 102 of the switch 100. Accordingly, the computer 112 will require substantially more time to compare the operative subscriber database of the memory 102 to the damaged database of the tape 104 in task 206.

As mentioned hereinabove, operators of the switch 100 typically duplicate the operational system generic tape 104 on a weekly basis, and place the backup tape 106 in storage. Therefore, when a defect is determined to exist in the tape 104, a switch operator can manually retrieve from storage a backup tape 106 that was created before the defect in the tape 104 occurred, and utilize the tape 106 in task 202.

Accordingly, if the differences between the operative subscriber database of the memory 102 and the subscriber database of the tape 106 are fewer than the differences between operative subscriber database of the memory 102 and the subscriber database of the tape 104, the task 206 will operate more efficiently if the tape 106 is utilized in task 202.

Therefore, it is left to the operator's discretion whether to utilize the damaged system generic tape 104 or the backup system generic tape 106 in the subscriber database program. Similarly, the tape 104 can be used in substitution for the backup tape 106 in the denied service database update and audit data update programs described hereinbelow.

Additionally, alternative embodiments of the denied service update program and the audit data update program are contemplated. As with the subscriber database update program, these embodiments are utilized when the system generic tape has only suffered slight damage, and involve use of the system generic tape 104 instead of the backup tape 106.

While there have been shown what are at present considered to be preferred embodiments of the invention, it will be apparent to those skilled in the art that various changes and modifications can be made herein without departing from the scope of the invention as defined by the appended claims.

TABLE IV

```
10 CLS
30 '
40 PRINT"**** Subscriber Compare Program    *****"
50 PRINT"**** GTE Mobilnet                  *****"
60 PRINT"**** July 27,1987                  *****"
70 PRINT"**** by Phillip Altine             *****"
80 PRINT
90 '
100 O%=1:T%=2:TH%=3:F%=4:FI%=5:S%=6:SE%=7:E%=8:N%=9:TEN%=10:
    TT%=10000:
    NT%=19:ST%=17:TE%=28:THE%=38:Z%=0:TW%=12:TWE%=20
110 DEF FNX=VAL(MID$(X$,SE%,F%))+1:DEF
    FNY=VAL(MID$(X$,NT%,F%))+1:                    DEF
    FNFP$=MID$(X$,16,T%):DEF FNOC$=MID$(X$,27,T%):
    DEF FNSER$=MID$(X$,37,E%)
120 DEF FNMT$=LEFT$(X$,S%):DEF FNVA=INSTR(X$,"VACANT"):DEF
    FNDD=INSTR(X$,"—"):      DEF FNNO=INSTR(X$,"NOT"):DEF
    FNX1$="000"+RIGHT$(X$,O%):                      DEF
    FNX2$="00"+RIGHT$(X$,T%):DEF FNX3$="0"+RIGHT$(X$,TH%)
130 DEF FNX4$=RIGHT$(X$,F%)
140 CN=0
150 ON ERROR GOTO 490
160 PRINT"**** THIS PROGRAM WILL COMPARE OLD SUB. FILE TO
    NEW SUB FILE ****"
170 PRINT
180 INPUT "ENTER NPA ";NPA$:INPUT "ENTER NXX ";NXX$
190 PRINT
200 INPUT "ENTER OLD FILE NAME ";OL$:INPUT "ENTER NEW FILE
    NAME ";NW$
210 INPUT "ENTER SUBTRE FILE ";SUB$
```

TABLE IV-continued

```
215 INPUT "ENTER OUTPUT FILE NAME ";N4$
220 OPEN OL$ FOR INPUT AS #1:CLOSE
230 OPEN NW$ FOR INPUT AS #1:CLOSE
240 OPEN SUB$ FOR INPUT AS #1:CLOSE
250 MT$=NPA$+NXX$
260 PRINT TIME$
270 PRINT
280 OPEN OL$ FOR INPUT AS O%:OPEN "R",T%,MT$+"R.OLD"
290 FIELD T%,T% AS FP$,T% AS OC$,E% AS SER$
300 PRINT "READING IN OLD FILE"
310 FOR X=1 TO 10000:LSET FP$=" ":LSET OC$="
    ":LSET SER$="
320 PUT T%,X:NEXT
330 PRINT
340 MT$=NPA$+NXX$
350 INPUT #O%,X$:IF FNMT$<>MT$ THEN GOTO 350
360 IF FNVA>Z% THEN GOTO 370:ELSE GOTO 400
370 IF FNDD>Z% THEN X=FNX:Y=FNY:ELSE X=FNX:Y=FNX
380 FOR N = X TO Y:LSET OC$=" ":LSET FP$="
    ":LSET SER$=" VACANT ":PUT T%,N:          NEXT
390 GOTO 350
400 IF FNNO>Z% THEN GOTO 410:ELSE GOTO 440
410 IF FNDD>Z% THEN X=FNX:Y=FNY:ELSE X=FNX:Y=FNX
420 FOR N = X TO Y:LSET OC$="T ":LSET FP$="NO":LSET
    SER$="ASSIGNED":PUT T%,N:          NEXT
430 GOTO 350
440 CN=CN+1
450 X=FNX
460 LSET FP$=FNFP$:LSET OC$=FNOC$:LSET SER$=FNSER$
470 PUT T%,X
480 GOTO 350
490 ER=ERR:EL=ERL:RESUME 500
500 IF ER=53 THEN CLS:PRINT "FILE NOT FOUND":CLOSE :GOTO 180
510 IF ER=62 AND EL=350 THEN GOTO 530
520 STOP
530 ON ERROR GOTO 790
540 CLOSE
550 LPRINT "NUMBER OF ACTIVE SUBSCRIBERS IN OLD FILE = ";CN
560 PRINT "NUMBER OF ACTIVE SUBSCRIBERS IN OLD FILE =
    ";CN:CN=0
570 LPRINT
580 PRINT
590 PRINT "READING IN NEW FILE"
600 PRINT
610 OPEN NW$ FOR INPUT AS O%:OPEN "R",T%,MT$+"R.NEW"
620 FIELD T%,T% AS FP$,T% AS OC$,E% AS SER$
630 FOR X=1 TO 10000:LSET FP$=" ":LSET OC$="
    ":LSET SER$="
640 PUT T%,X:NEXT
650 INPUT #O%,X$:IF FNMT$<>MT$ THEN GOTO 650
660 IF FNVA>0 THEN GOTO 670:ELSE GOTO 700
670 IF FNDD>0 THEN X=FNX:Y=FNY:ELSE X=FNX:Y=FNX
680 FOR N = X TO Y:LSET OC$=" ":LSET FP$="
    ":LSET SER$=" VACANT ":PUT T%,N:          NEXT
690 GOTO 650
700 IF FNNO>0 THEN GOTO 710:ELSE GOTO 740
710 IF FNDD>0 THEN X=FNX:Y=FNY:ELSE X=FNX:Y=FNY
720 FOR N = X TO Y:LSET OC$="T ":LSET FP$="NO"
    :LSET SER$="ASSIGNED":PUT T%,N:          NEXT
730 GOTO 650
740 X=FNX
750 CN=CN+1
760 LSET FP$=FNFP$:LSET OC$=FNOC$:LSET SER$=FNSER$
770 PUT T%,X
780 GOTO 650
790 ER=ERR:EL=ERL:RESUME 800
800 IF ER=62 AND EL=650 THEN GOTO 820
810 STOP
820 LPRINT "NUMBER OF ACTIVE SUBSCRIBERS IN NEW FILE = ";CN
830 PRINT "NUMBER OF ACTIVE SUBSCRIBERS IN NEW FILE =
    ";CN:CN=0
840 LPRINT
850 PRINT
860 ON ERROR GOTO 1190
870 CLOSE :OPEN "R",O%,MT$+"R.OLD":OPEN "R",T%,MT$+"R.NEW"
880 OPEN N4$ FOR OUTPUT AS #4
890 OPEN SUB$ FOR INPUT AS #3
900 FIELD O%,TW% AS A$
910 FIELD T%,TW% AS B$
920 LINE INPUT #3,SB$
930 IF INSTR(SB$,MT$) THEN GOTO 940:ELSE GOTO 920
940 X=INSTR(SB$,MT$):S=VAL(MID$(SB$,X+6,4))+1
```

TABLE IV-continued

```
950 IF INSTR(SB$,"SFT") THEN E=S+10:ELSE IF INSTR(SB$,"SFH")
    THEN E=S+100
960 FOR X=S TO E
970 GET O%,X:GET T%,X
980 LOCATE TWE%,TEN%:PRINT "COMPARING # = ";MT$;X
990 IF A$<>B$ THEN GOTO 1010
1000 GOTO 1170
1010 '
1020 LPRINT "          MID";TAB(20) "FP    OC      SER"
1030 IF LEFT$(A$,TH%)="NOT" THEN PRT$="   NOT ASSIGNED":ELSE
    IF INSTR(A$,"VACANT") THEN PRT$="    VACANT":ELSE
    PRT$=LEFT$(A$,T%)+"   "+MID$(A$,TH%,T%)+"
    "+RIGHT$(A$,E%)
1040 Y=X-1
1050 X$=STR$(Y)
1060 IF LEN(X$)=T% THEN X$=FNX1$
1070 IF LEN(X$)=TH% THEN X$=FNX2$
1080 IF LEN(X$)=F% THEN X$=FNX3$
1090 IF LEN(X$)=FI% THEN X$=FNX4$
1100 LPRINT "OLD = "+MT$;X$;TAB(20) PRT$
1110 IF LEFT$(B$,TH%)="NOT" THEN PRT2$="   NOT ASSIGNED":ELSE
    IF INSTR(B$,"VACANT") THEN PRT2$="    VACANT":ELSE
    PRT2$=LEFT$(B$,T%)+"  "+MID$(B$,TH%,T%)+"
    "+RIGHT$(B$,E%)
1120 LPRINT "NEW = "+MT$;X$;TAB(20) PRT2$
1130 IF INSTR(PRT$,"VACANT") THEN PRINT
    #4,"DELLS:"+MT$+X$+"*":GOTO 1160
1131 IF INSTR(PRT$,"NOT") THEN PRINT
    4,"DELLS:"+MT$+X$+"*":GOTO 1160
1140 IF INSTR(PRT2$,"VACANT") THEN PRINT
    #4,"ADDLS:"+MT$+X$+":LKA=1:FP="+LEFT$(A$,T%)+":OC=
    "+MID$(A
    $,TH%,T%)+":SER=H'"+RIGHT$(A$,E%)+"*":GOTO 1160
1141 IF INSTR(PRT2$,"NOT") THEN PRINT
    #4,"ADDLS:"+MT$+X$+":LKA=1:FP="+LEFT$(A$,T%)+":OC=
    "+MID$(A
    $,TH%,T%)+":SER=H'"+RIGHT$(A$,E%)+"*":GOTO 1160
1150 PRINT
    #4,"CHGLS:"+MT$+X$+":FP="+LEFT$(A$,T%)+":OC=
    "+MID$(A$,TH%,
    T%)+":SER=H'"+RIGHT$(A$,E%)+"*":GOTO 1160
1160 'LPRINT
1170 NEXT
1180 GOTO 920
1190 ER=ERR:EL=ERL:RESUME 1200
1200 IF ER=62 AND EL=920 THEN GOTO 1220
1210 STOP
1220 PRINT TIME$
1230 PRINT
1240 BEEP:BEEP:BEEP:PRINT "FINISHED"
```

TABLE VI

```
10 ON ERROR GOTO 180
20 T1$=TIME$
30 OLD$="sort.old"
40 N$="sort.new"
50 OPEN N$ FOR INPUT AS #1
60 OPEN OLD$ FOR INPUT AS #2
70 OPEN "UPDATE.ESN"FOR OUTPUT AS #3
80 DIM A$(10000)
90 WHILE NOT EOF(2)
100 INPUT #2,B$
102 A$(X)=B$
105 X=X+1
110 WEND
115 Z=X
120 INPUT #1,B$
125 IF LEN(B$)=0 THEN GOTO 120
130 IF INSTR(B$," ") THEN GOTO 120
150 FOR X=Y TO Z :IF B$=A$(X) THEN Y=X:GOTO 120
160 NEXT
165 PRINT "RESSD:SER=H'"+B$+"*"
170 PRINT #3,"RESSD:SER=H'"+B$+"*":Y=1:GOTO 120
180 ER=ERR:EL=ERL:RESUME 190
190 PRINT T1$,TIME$:PRINT ER,EL:IF ER=62 AND EL=120 THEN
    GOTO 200:ELSE STOP
200 CLOSE 1:CLOSE 2
210 OPEN OLD$ FOR INPUT AS #1
220 OPEN N$ FOR INPUT AS #2
225 X=0
```

TABLE VI-continued

```
230 WHILE NOT EOF(2)
240 INPUT #2,B$
250 A$(X)=B$
260 X=X+1
270 WEND
280 Z=X
290 INPUT #1,B$
295 IF LEN(B$)=0 THEN GOTO 290
300 IF INSTR(B$," ") THEN GOTO 290
320 FOR X=Y TO Z :IF B$=A$(X) THEN Y=X:GOTO 290
330 NEXT
335 PRINT"DESSD:SER=H'"+B$+"*"
340 PRINT #3,"DESSD:SER=H'"+B$+"*":Y=1:GOTO 290
```

TABLE VII

```
0 CLS
5 ON ERROR GOTO 500
10 INPUT "ENTER INPUT FILE NAME ";N1$
20 INPUT "ENTER OUTPUT FILE NAME ";N2$
30 OPEN N1W$ FOR INPUT AS #1
40 OPEN N2$ FOR OUTPUT AS #2
50 LINE INPUT #1,A$
60 IF INSTR(A$,"LOCAL MISMATCH") THEN
    X=INSTR(A$,"MID="):M$=MID$(A$,X+4,10):ELSE GOTO 50
75 INPUT #1,B1$:IF INSTR(B1$,"ACT") THEN GOTO 80:ELSE IF
    INSTR(B1$,"LOCAL") THEN GOTO 60:ELSE GOTO 75
80 INPUT #1,B2$:IF INSTR(B2$,"SBY") THEN GOTO 85:ELSE IF
    INSTR(B2$,"LOCAL") THEN GOTO 60:ELSE GOTO 80
85 IF INSTR(B1$,"RN=") THEN
    C=C+1:CMD$="DELRM:"+RIGHT$(B1$,10)+"*":PRINT
    C,CMD$:PRINT#2,CMD$
86 IF INSTR(B2$,"RN=") THEN
    C=C+1:CMD$="DELRM:"+RIGHT$(B2$,10)+"*":PRINT
    C,CMD$:PRINT#2,CMD$:GOTO 50:ELSE IF INSTR(B1$,"RN=")
    THEN
    GOTO 50
90 IF INSTR(B1$,"NOT") THEN CMD$="DELLS:"+M$+"*":GOTO 120
100 IF INSTR(B2$,"NOT") THEN
    CMD$="ADDLS:"+M$+":LKA=1:SER=H'"+MID$(B1$,22,8)+":FP="
    +MID
    $(B1$,9,2)+":OC="+MID$(B1$,16,2)+":CP="+MID$(B1$,12,2)
    +":T
    C="+MID$(B1$,34,2)+"*":GOTO 120
110
    CMD$="CHGLS:"+M$+":LKA=1:SER=H'"+MID$(B1$,22,8)+":FP=
    "+MID
    $(B1$,9,2)+":OC="+MID$(B1$,16,2)+":Cp="+MID$(B1$,12,2)
    +":T
    C="+MID$(B1$,34,2)+"*"
120 C=C+1:PRINT C,CMD$:PRINT #2,CMD$:GOTO 50
500 ER=ERR:EL=ERL:RESUME 510
510 CLOSE:PRINT ER,EL
```

TABLE VIII

```
10 ON ERROR GOTO 330
20'********************************************************
30'* SUBSCRIBER FEATURE FILE CREATION PROGRAM
50'********************************************************
60 KEY OFF
70 CLS
80 LOCATE 5,29
90 PRINT "FEATURE FILE PROGRAM"
100 LOCATE 6,24
110 PRINT "Creates file of active features"
120 LOCATE 7,25
130 PRINT "To be re-ented to the switch"
140 LOCATE 8,35
150 LOCATE 12,5:INPUT "ENTER SUBSCRIBER FILE NAME ";N$
160 LOCATE 14,5:INPUT "ENTER OUTPUT FILE NAME ";NAM$
170 OPEN NAM$ FOR OUTPUT AS #3
180 OPEN N$ FOR INPUT AS #1
190 LOCATE 16,28 :PRINT "NOW WORKING ON : ";N$
200 WHILE NOT EOF(1)
210 B$=A$
220 INPUT #1,A$
230 IF INSTR(A$,"FT") THEN GOTO 240:ELSE GOTO 290
240 X=INSTR(A$,"FT"):Y=INSTR(A$,"FN"):FT$=MID$(A$,X+3,Y-4)
250 FW$=MID$(A$,Y+2,15)
```

TABLE VIII-continued

```
260 CMD$="CHGLS:"+LEFT$(B$,10)+":"+FT$+FW$+"*"
261 FOR X=1 TO LEN(CMD$)
262 IF MID$(CMD$,X,1)=" " THEN GOTO 265:ELSE
    CMD1$=CMD1$+MID$(CMD$,X,1)
265 NEXT
269 C=C+1
270 PRINT #3,CMD1$:PRINT CMD1$
271 CMD1$=""
290 WEND
300 CLOSE #1
310 CLOSE #3
320 PRINT "FEATURES = ";C:SYSTEM
330 PRINT "ERROR=";ERR,"ERROR LINE =";ERL:IF ERR=53 THEN
    CLS:PRINT "FILE NOT FOUND ":GOTO 80:ELSE RESUME
```

I claim:

1. A computer implemented method for reconstructing lost data on a cellular switch database and a system generic tape for the cellular switch whereby the reconstructed data of a backup system generic tape can be used to operate the cellular switch, the cellular switch having a primary random access memory and secondary random access memory wherein said primary random access memory and said secondary random access memory having identical information, comprising the computer implemented steps of:

(a) reading an existing switch database stored in said primary random access memory into an external computer, (b) placing the existing switch database stored in said primary memory in a standby mode on the cellular switch, (c) placing the existing system generic tape on a cellular switch in a standby mode, (d) moving into the cellular switch a copy of the backup system generic tape whereby said backup copy becomes a primary switch database stored in the primary random access memory and said backup system generic tape becomes a current system generic tape, (e) reading from the primary random access memory into the external computer a copy of the backup system generic tape contents, (f) comparing in the external computer the existing switch database originally stored in the primary random memory and the contents of the backup system generic tape to identify any differences therebetween, (g) converting any such differences into switch commands, (h) transmitting and verifying each of the switch commands from the external computer to the primary switch database stored in the primary random access memory and the current system generic tape, and (i) overwriting the contents in the secondary random access memory of the cellular switch with the contents in the primary memory of the cellular switch.

2. The method of claim 1, wherein the comparing step comprises:

(a) reading a subscriber file access tree from the primary random access memory of the cellular switch into the external computer, said subscriber file access tree containing one or more mobile telephone numbers, (b) interpreting in the external computer the subscriber file access tree in order to identify the mobile telephone numbers that have been allocated for use, and (c) comparing in the external computer for each said allocated mobile telephone number, a first database record corresponding to the allocated mobile telephone number with a second database record corresponding to the allocated mobile telephone number.

3. The method of claim 2, wherein the converting step comprises:

(a) writing, for each said assigned mobile telephone number to which different first and second database records correspond, an instruction such as add, delete, or change command to a text file, said instruction being compatible with the switch.

* * * * *